US006441891B1

(12) United States Patent
Levasseur et al.

(10) Patent No.: US 6,441,891 B1
(45) Date of Patent: Aug. 27, 2002

(54) SYSTEM FOR DETECTING A FOREIGN OBJECT ATTACHED TO A BILL PASSING THROUGH A BILL VALIDATOR

(75) Inventors: Joseph L. Levasseur, Chesterfield; Mark H. Leibu, St. Louis, both of MO (US)

(73) Assignee: Coin Acceptors, Inc., St. Louis, MO (US)

( * ) Notice: Subject to any disclaimer, the term of this patent is extended or adjusted under 35 U.S.C. 154(b) by 0 days.

(21) Appl. No.: 09/553,194

(22) Filed: Apr. 20, 2000

(51) Int. Cl.[7] .......................... G06K 9/74; G06K 15/00; G01N 21/86

(52) U.S. Cl. .......................... 356/71; 250/556; 250/557; 250/559.4

(58) Field of Search ............................ 356/71; 250/555, 250/556, 557, 559.39, 559.4, 559.44

(56) References Cited

U.S. PATENT DOCUMENTS

| | | | | |
|---|---|---|---|---|
| 4,348,656 A | | 9/1982 | Gorgone et al. | 340/146.3 R |
| 4,413,718 A | | 11/1983 | Dean | 194/1 K |
| 5,632,367 A | | 5/1997 | Bergeron et al. | 194/207 |
| 5,988,345 A | | 11/1999 | Bergeron et al. | 194/203 |
| 6,044,952 A | * | 4/2000 | Haggerty et al. | 194/207 |

* cited by examiner

*Primary Examiner*—Frank G. Font
*Assistant Examiner*—Roy M. Punnoose
(74) *Attorney, Agent, or Firm*—Haverstock, Garrett & Roberts LLP

(57) ABSTRACT

A bill validator for detecting the presence of a bill comprising a bill passageway having a first side and a second side, a light source positioned at the first side, the light source for emitting light across the passageway, a reflecting surface positioned at the second side, and a detector device positioned at the first side, the detector device for receiving light reflected from the reflecting surface.

21 Claims, 4 Drawing Sheets

SYSTEM FOR DETECTING A FOREIGN OBJECT ATTACHED TO A BILL PASSING THROUGH A BILL VALIDATOR

BACKGROUND OF THE INVENTION

The present invention relates to a bill validator utilized in a vending machine which is capable of accepting and storing bills and in particular to a bill validator having a bill detection device.

Vending machines typically include coin changer devices for accepting coins of different denominations and bill validator devices or bill validators for accepting and storing paper currency. In particular, the bill validator device functions to authenticate bills or paper currency inserted into the vending machine and to store the bills for later retrieval. Known bill validator devices utilize various bill detection techniques and methods which include optical detection. In operation, a deposited bill is routed along a bill path to pass by optical sensors. The optical sensors are used to validate the bill and once validated and credited the bill is routed to a magazine for storage. One method which is used to defeat a bill validator is to attach string or tape to a bill and attempt to retrieve the bill once the bill has been accepted. It is important to be able to detect string, tape, or any other foreign object attached to a bill in order to prevent such fraud.

Accordingly, it is desirable and advantageous to provide a bill validator device having a detector device which is capable of determining whether string, tape, or any other foreign object has been attached to a bill. It would be further desirable to employ a bill validator which is capable of detecting a condition when a bill, which has been credited by the bill validator, is attempting to be retrieved. Additionally, it would be advantageous to have a bill validator device which is more accurate in detecting the presence of a bill or a foreign object in a bill passageway of the bill validator.

SUMMARY OF THE INVENTION

The bill validator device of the present invention is capable of detecting the presence of a bill with the bill validator comprising a bill passageway having a first side and a second side, a light source positioned at the first side, the light source for emitting light across the passageway, a reflecting surface positioned at the second side, and a detector device positioned at the first side, the detector device for receiving light reflected from the reflecting surface.

In another form of the present invention, a bill validator for detecting the presence of a bill comprises a bill passageway having a first side and a second side, a prism positioned at the first side, a reflecting surface positioned at the second side, a light source positioned at the first side, and a detector device positioned at the first side, the light source for emitting light at the prism to reflect the light across the passageway at the reflecting surface and the detector device for receiving light reflected from the reflecting surface.

Another form of the present invention is a bill validator for detecting the presence of a bill which comprises a bill passageway having a first side and a second side, a first prism positioned at the first side, a second prism positioned at the first side, a reflecting surface positioned at the second side, a light source positioned adjacent to the first prism, and a detector device positioned adjacent to the second prism, the light source for emitting light at the first prism to reflect the light across the passageway at the reflecting surface and the detector device for receiving light reflected through the second prism from the reflecting surface.

Accordingly, it is an object of the present invention to provide a bill validator device which is capable of detecting bills and other objects inserted into the bill validator device.

It is another object of the present invention to provide a bill validator which has a validation portion which is of compact design.

It is a further object of the present invention to provide a bill validator device which can be used to distinguish between a number of different objects without the need for replicative circuitry.

A further object of the present invention is to provide a bill validator device which is usable with other coin detection and validation devices.

Another object of the present invention is to provide a bill validator device for use in coin operated vending systems for distinguishing between acceptable bills and unacceptable objects deposited by customers.

A still further object of the present invention is to provide a bill validator device for identifying undesired and counterfeit bills or currencies and non-bill objects, and for also determining and aiding in the determination of acceptable bills.

These and other objects and advantages of the present invention will become apparent after considering the following detailed specification in conjunction with the accompanying drawings, wherein:

DETAILED DESCRIPTION OF THE PREFERRED EMBODIMENTS

Figure 1:
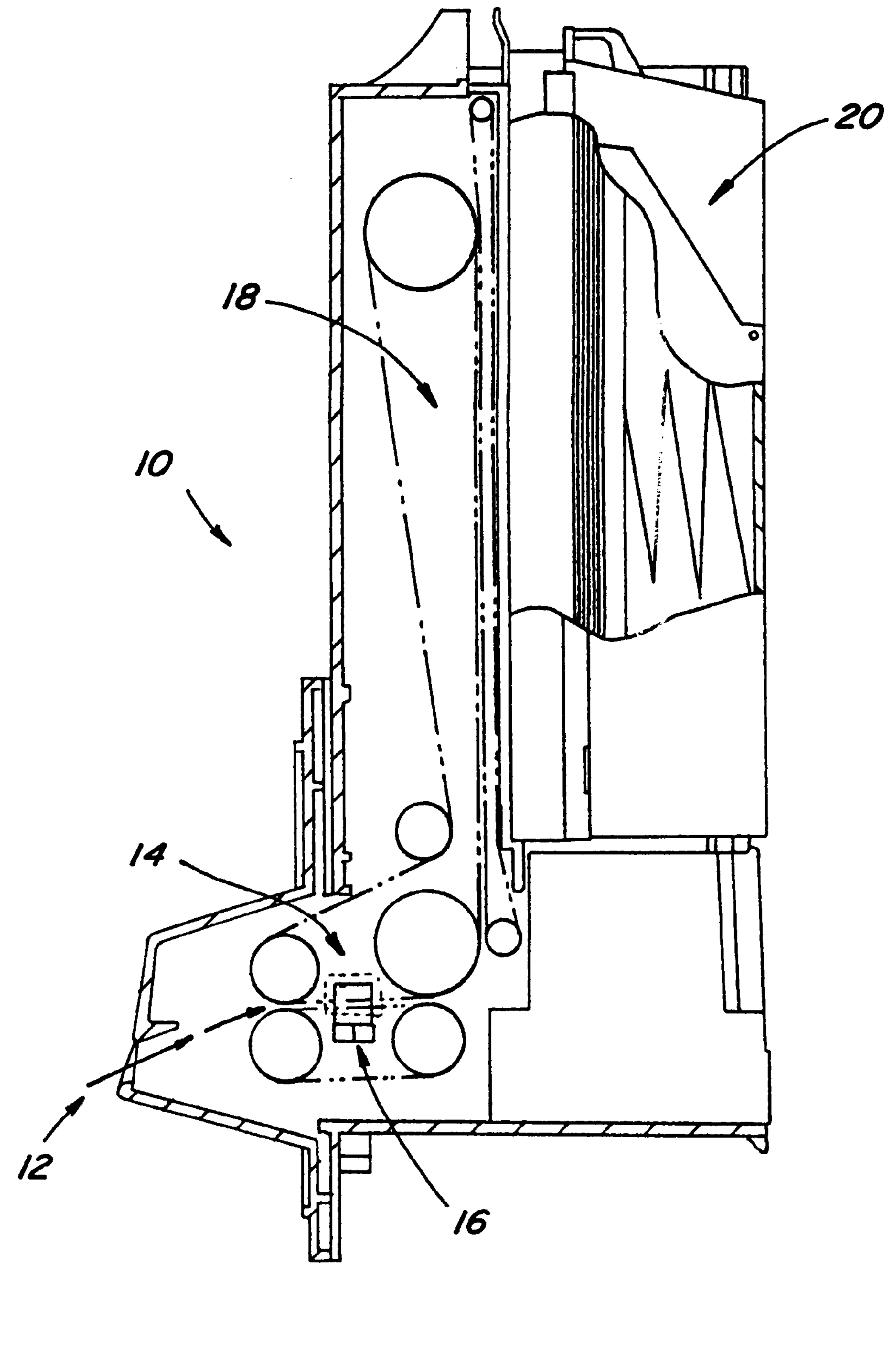
FIG. 1 is a cross-section view of a bill validator constructed according to the present invention.

Referring now to the drawings, wherein like numerals refer to like items, number 10 identifies a preferred embodiment of a bill validator constructed according to the present invention. With reference now to FIG. 1, the bill validator 10 is used to authenticate paper currency or a bill which is inserted into an opening 12 of the validator 10. The bill validator 10 also comprises a validation portion 14, a bill detection device 16, a transport and stacking section 18, and a storage magazine 20. The bill validator 10 is adapted to have a bill (not shown) inserted into the opening 12 to pass by the validation portion 14 and the bill detection device 16 to be moved to the transport and stacking section 18 for later storage in the magazine 20. Although not numbered, the bill validator 10 also includes various other structures such as rollers, motors, and belts which aid in advancing a bill through the device 10 until it is stored within the magazine 20 or rejected back out of the opening 12. The validation portion 14 is used to determine whether the inserted bill is genuine, and if it is determined to be genuine, to credit the amount of the bill and to send the bill to be stored or accumulated in the magazine 20 for later retrieval. If the bill is determined to be counterfeit or for some other reason to be unacceptable, the bill is rejected back to the user. The bill detection device 16 may be used to determine if a foreign object, such as a string, has been attached to the bill.

Figure 2:
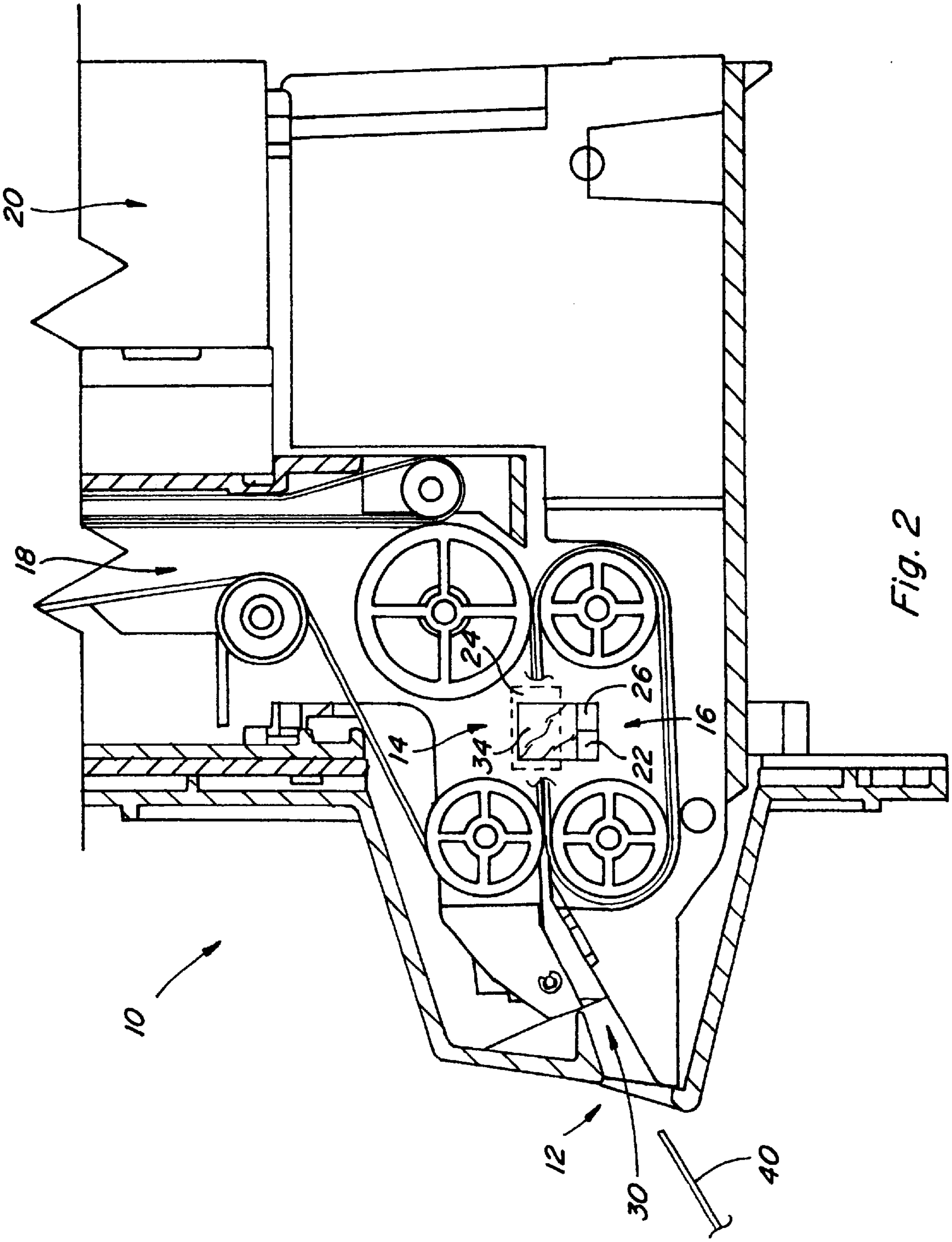
FIG. 2 is a partial cross-section view of a bill detection device of the bill validator shown in FIG. 1 which is constructed according to the present invention.
Figure 3:
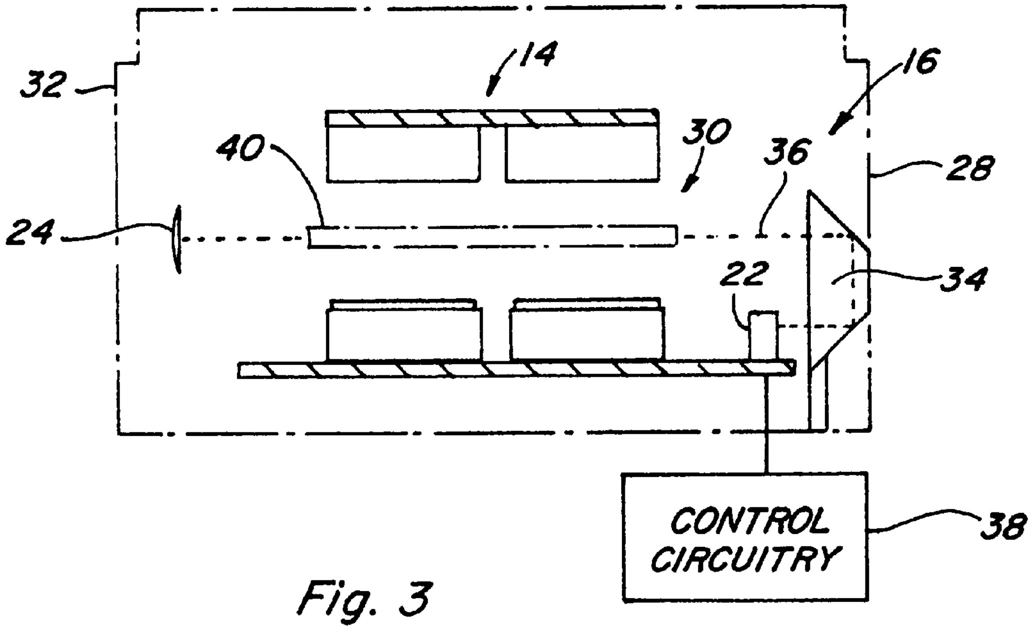
FIG. 3 is a partial cross-sectional view of the bill detection device shown in FIG. 2 taken along the plane of line 2—2.

Referring now to FIGS. 2 and 3, a preferred embodiment of the bill detection device 16 of the bill validator 10 is shown. The bill detection device 16 is illustrated comprising a light source 22, such as a light emitting diode (LED), a reflecting surface 24, and a detector device 26, such as a phototransistor. The light source 22 and the detector device 26 are positioned or located at a first side 28 of a bill passageway 30. The reflecting surface 24 is positioned or located at a second side 32 of the bill passageway 30. The bill detection device 16 further comprises a prism 34 which is located at the first side 28 and is positioned in front of the light source 22 and the detector device 26.

In operation, a beam of light 36, which is generated or produced by the light source 22, is sent to the prism 34. The prism 34 then directs the beam of light 36 across the bill passageway 30 until it is reflected back by the reflecting surface 24. The beam of light 36 is then directed by the prism 34 to the detector device 26. The light source 22 and the detector device 26 are connected to control circuity 38, such as a microprocessor, which is used to determine if a bill 40 is in the bill passageway 30. In particular, the control circuitry 38 is used to determine the intensity of light being detected by the detector device 26. If the intensity of light detected is high, then the control circuitry 38 will conclude that there is no bill 40 in the bill passageway 30. However, if the intensity of detected light is low, then the control circuitry 38 will indicate that there is either a bill 40 in the bill passageway 30 or that a foreign object has been detected. The bill validator 10 may have other detection devices (not shown) associated with the transport and stacking section 18 which would indicate to the control circuitry 38 that a bill 40 has progressed to the section 18. If the bill 40 is in position at the section 18, the control circuitry 38 may determine if the bill detection device 16 is detecting a foreign object. In this case, the control circuitry 38 would not accept the bill 40 or would not credit the bill 40. This would prevent the use of a string attached to the bill 40 or any other foreign object attached to the bill 40 to retrieve the bill 40 once the bill validator 10 has credited the bill 40.

Figure 4:
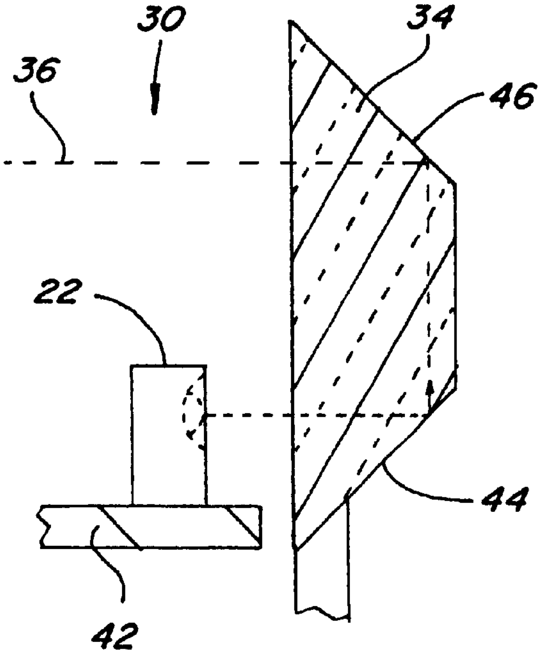
FIG. 4 is a partial enlarged view of the right side of FIG. 3.

FIG. 4 shows an enlarged view of a portion of the bill detection device 16. The light source 22 is connected to a board 42, such as a printed circuit board. The light source 22 generates the beam of light 36 which is directed at the prism 34. The beam of light 36 is reflected out of the prism 34 across the bill passageway. The reflection of the beam of light 36 within the prism 34 occurs by being reflected by a face 44 toward another face 46 and then out of the prism 34. In the same manner, the beam of light 36, which has been reflected back across the bill passageway 30 by the reflecting surface 24, enters the prism 34 and is reflected by the face 46 toward the face 44 and then out of the prism 34 to be detected by the detector device 26.

Figure 5:
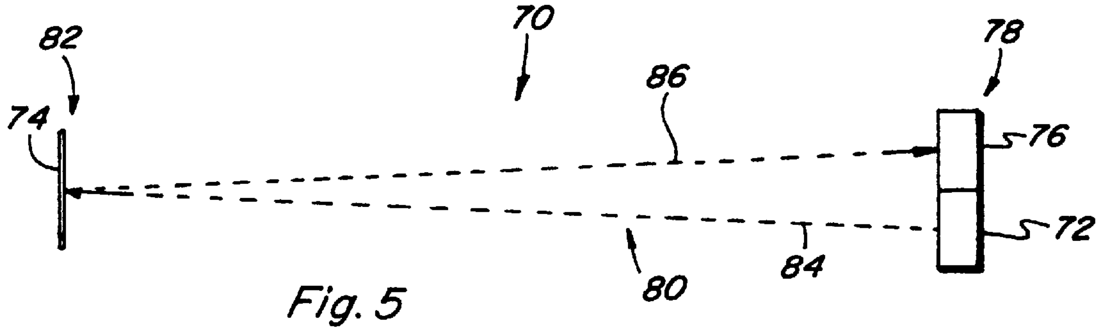
FIG. 5 is another preferred embodiment of a bill validator constructed according to the present invention.

With reference now to FIG. 5, another embodiment of a bill detection device 70 is depicted. The bill detection device 70 comprises a light source 72, a reflecting surface 74, and a detector device 76. The light source 72 and the detector device 76 are positioned or located at a first side 78 of a bill passageway 80. The reflecting surface 74 is positioned or located at a second side 82 of the bill passageway 80. A beam of light 84 is produced by the light source 72 to be directed across the bill passageway 80. The beam of light 84 is reflected by the reflecting surface 74 as a reflected beam of light 86. The reflected beam of light 86 is directed at the detector device 76. The light source 72 and the detector device 76 are also connected to control circuitry, which is not shown. The control circuitry is used to determined the intensity of light being detected by the detector device 76 which is indicative of whether a bill or a foreign object is in the bill passageway 80. In the bill detection device 70, the beam of light 84 is capable of being sent directly across the bill passageway 80 without the use of a prism.

Figure 6:
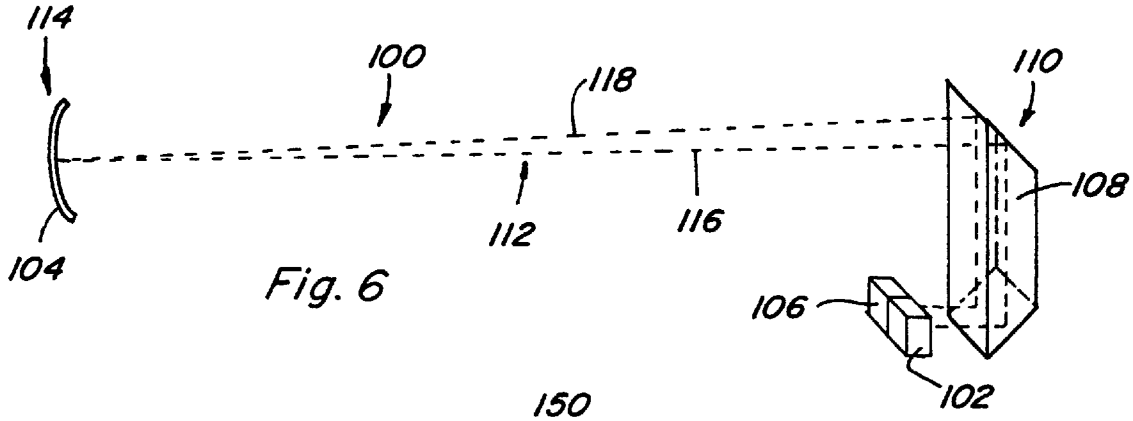
FIG. 6 is a further preferred embodiment of a bill validator constructed according to the present invention.

FIG. 6 illustrates another preferred embodiment of a bill detection device 100 constructed according to the present invention. The bill detection device 100 comprises a light source 102, a reflecting device 104, such as a concave mirror, a detector device 106, and a prism 108. The light source 102, the detector device 106, and the prism 108 are located at a first side 110 of a bill passageway 112. The reflecting device 104 is positioned at a second side 114 of the bill passageway 112. The light source 102 is used to produce a beam of light 116 which is directed at the prism 108. The beam of light 116 is reflected out of the prism 108 across the bill passageway 112 toward the reflecting device 104. The reflecting device 104 reflects the beam of light 116 as a reflected beam of light 118 back across the bill passageway 112 at the prism 108. The prism 108 internally reflects the beam of light 118 at the detector device 106. Although not shown, the light source 102 and the detector device 106 are connected to control circuitry which is used to control the light source 102 and to determine the intensity of light being detected by the detector device 106. Depending on the level of light being detected, the control circuitry is able to determine the presence of a bill or a foreign object within the bill passageway 112. Additionally, although a concave mirror is disclosed as the reflecting device 104, a convex mirror or other suitable reflecting device may be used.

Figure 7:
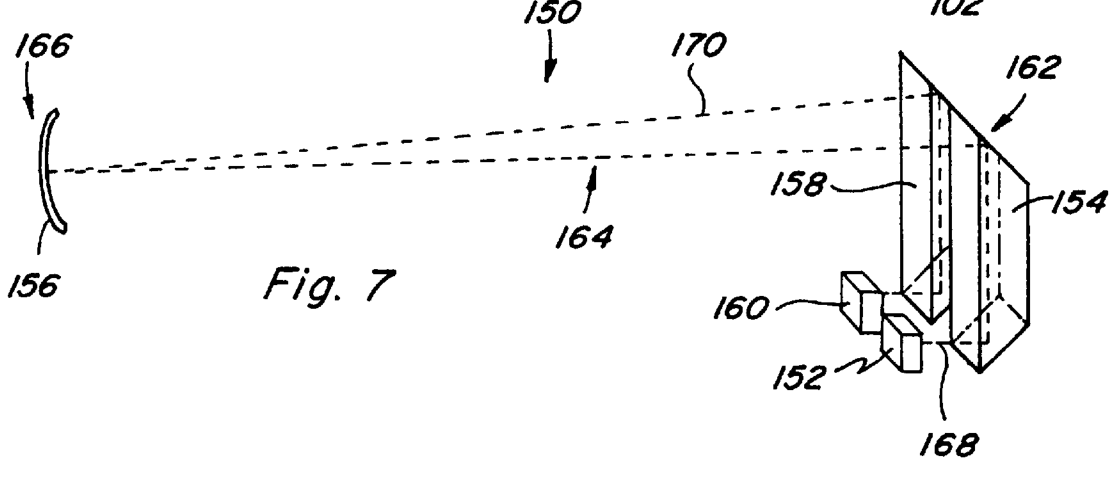
FIG. 7 is still another preferred embodiment of a bill validator constructed according to the present invention.

Another preferred embodiment of a bill detection device 150 is shown in FIG. 7. The bill detection device 150 comprises a light source 152, a first prism 154, a reflecting surface 156, a second prism 158, and a detector device 160. The light source 152, the first and second prisms 154 and 158, and the detector device 160 are all located at a first side 162 of a bill passageway 164. The reflecting surface 156 is positioned at a second side 166 of the bill passageway 164. The first prism 154 is adjacent to the light source 152 and the second prism 158 is adjacent to the detector device 160.

In operation, the light source 152 produces a beam of light 168 which is directed at the first prism 154. The first prism 154 then redirects the beam of light 168 across the bill passageway 164 at the reflecting surface 156. The reflecting surface reflects a beam of light 170 across the bill passageway at the second prism 158. The second prism 158 reflects the beam of light 170 into the detector device 160. Again, control circuitry (not shown) may be connected to the light source 152 and the detector device 160. The control circuitry is employed to determine the intensity of light being detected by the detector device 160 which is representative of whether a foreign object is attached to a bill in the bill passageway 164.

From all that has been said, it will be clear that there has thus been shown and described herein a bill validator which fulfills the various objects and advantages sought therefor. It will be apparent to those skilled in the art, however, that many changes, modifications, variations, and other uses of the subject bill validator are possible and contemplated. All changes, modifications, variations, and other uses and applications which do not depart from the spirit and scope of the invention are deemed to be covered by the invention, which is limited only by the claims which follow.

What is claimed is:

1. A system for detecting the presence of a trailing foreign object connected to a bill traveling in a predetermined direction through a generally planar passageway of a bill validator having first and second sides, comprising:

a light source apparatus disposed along the first side of the passageway and operable to affect the transmission of light laterally across the passageway, and a reflective surface disposed along the second side of the passageway in position for reflecting transmitted light received thereat, back across the passageway, and a detector portion disposed along the first side of the passageway for receiving and responding to the reflected light, the light source apparatus, the reflective surface and the detector portion, being so positioned relative to one another that a bill traveling through the passageway will obstruct the passage of light across the passageway and a trailing foreign object attached to the bill will obstruct at least some portion of the light being laterally transmitted and reflected across the passageway, whereby the continuing obstruction of at least a portion of the light after the bill has moved past said system is indicative of the presence of a trailing foreign object connected to a bill.

2. The system of claim 1 wherein the light source apparatus, the reflective surface, and the detector device are all in essentially the same plane as the planar passageway.

3. The system of claim 1 wherein the light source apparatus is positioned generally adjacent to the detector device.

4. The system of claim 1 wherein the light source apparatus includes an LED.

5. The system of claim 1 wherein the light source apparatus includes an LED and a prism.

6. The system of claim 1 wherein the detector portion includes a phototransistor.

7. The system of claim 1 wherein the detector portion includes a phototransistor and a prism.

8. The system of claim 1 wherein the reflecting surface is a mirror.

9. The system of claim 1 further comprising a control portion for monitoring the amount of light detected by the detector device to determine whether a foreign object is attached to a bill.

10. A system for detecting the presence of a foreign object connected to a bill traveling in a predetermined direction through a passageway having a first and second side, the bill having a leading edge with reference to the predetermined direction of travel of the bill, an opposite trailing edge, and side edges extending between the leading and trailing edges, comprising:

a light source apparatus disposed along a first side of the passageway in position for emitting light, and a reflective surface along a second side of the passageway opposite the first side in position for reflecting the light back across the passageway, and a detector portion disposed along the first side of the passageway in position for receiving and responding to the light even after the bill has moved through the passageway, wherein a bill with a foreign object attached thereto will obstruct some portion of the light emitted from the light source or reflected from the reflective surface while traveling through the passageway.

11. The system of claim 10 wherein the light source apparatus includes a reflective prism generally adjacent to a light source, the reflective prism in position to receive the light emitted from the light source and redirect the light in a direction across the passageway and across the bill when therein from one of the side edges towards the other side edge.

12. The system of claim 10 wherein the detector portion includes a reflective prism generally adjacent to a detector device, the reflective prism in position to receive the light reflected from the reflecting surface and redirect the light towards the detector device.

13. The system of claim 10 further comprising control portion for monitoring the amount of light detected by the detector device to determine whether a foreign object is attached to a bill.

14. The system of claim 11 wherein the light source is positioned below the prism.

15. The system of claim 10 wherein the reflective surface is a mirror.

16. The system of claim 15 wherein the mirror is a concave mirror.

17. The system of claim 15 wherein the mirror is a convex mirror.

18. A method for detecting the presence of a foreign object connected to a bill traveling in a predetermined direction through a passageway having first and second sides, comprising of the steps of:

emitting light laterally across the passageway from the first side to the second side of the passageway, reflecting the light back across the passageway, receiving and responding to the light even after the bill has moved through the passageway, whereby the continuing obstruction of at least a portion of the light after the bill has moved through the passageway is indicative of the presence of a trailing foreign object connected to a bill.

19. The method of claim 18 further comprising the step of monitoring the amount of light detected by the detector device to determine whether a foreign object is attached to a bill.

20. The method of claim 18 further comprising the step of redirecting the emitted light through a prism prior to reaching the reflective surface.

21. The method of claim 20 further comprising the step of redirecting the reflected light through a prism prior to receiving and responding to the light.

* * * * *